United States Patent
Zhang

(10) Patent No.: US 9,547,384 B2
(45) Date of Patent: Jan. 17, 2017

(54) CAPACITIVE IN-CELL TOUCH PANEL AND DISPLAY DEVICE

(71) Applicants: BOE TECHNOLOGY GROUP CO., LTD., Beijing (CN); CHENGDU BOE OPTOELECTRONICS TECHNOLOGY CO., LTD., Chengdu, Sichuan Province (CN)

(72) Inventor: Tian Zhang, Beijing (CN)

(73) Assignees: BOE TECHNOLOGY GROUP CO., LTD., Beijing (CN); CHENGDU BOE OPTOELECTRONICS TECHNOLOGY CO., LTD., Chengdu, Sichuan Province (CN)

(*) Notice: Subject to any disclaimer, the term of this patent is extended or adjusted under 35 U.S.C. 154(b) by 196 days.

(21) Appl. No.: 14/357,921

(22) PCT Filed: Nov. 13, 2013

(86) PCT No.: PCT/CN2013/087015
§ 371 (c)(1),
(2) Date: May 13, 2014

(87) PCT Pub. No.: WO2014/183395
PCT Pub. Date: Nov. 20, 2014

(65) Prior Publication Data
US 2015/0185933 A1 Jul. 2, 2015

(30) Foreign Application Priority Data
May 13, 2013 (CN) .......................... 2013 1 0175442

(51) Int. Cl.
G06F 3/041 (2006.01)
G06F 3/044 (2006.01)

(52) U.S. Cl.
CPC ............ G06F 3/0412 (2013.01); G06F 3/044 (2013.01); G06F 3/0416 (2013.01)

(58) Field of Classification Search
CPC ....... G06F 3/044; G06F 3/0416; G06F 3/0412
See application file for complete search history.

(56) References Cited

U.S. PATENT DOCUMENTS

| 2008/0055267 A1* | 3/2008 | Wu ..................... G06F 3/0412 345/173 |
| 2010/0136868 A1* | 6/2010 | Chien .................. G06F 3/0412 445/24 |
| 2010/0214247 A1* | 8/2010 | Tang ..................... G06F 3/044 345/173 |

(Continued)

FOREIGN PATENT DOCUMENTS

| CN | 101887333 A | 11/2010 |
| CN | 102314013 A | 1/2012 |

(Continued)

OTHER PUBLICATIONS

International Search Report Appln, No. PCT/CN2013/087015; Dated Feb. 27, 2014.

(Continued)

*Primary Examiner* — Ariel Balaoing
(74) *Attorney, Agent, or Firm* — Ladas & Parry LLP

(57) ABSTRACT

Embodiments of the present invention disclose a capacitive in-cell touch panel and a display device, with a touch sensing structure layer disposed on a side of an opposite substrate opposite to an array substrate, which side faces a liquid crystal layer; the touch sensing structure layer comprises a first touch sensing electrode and a second touch sensing electrode that are disposed in a same layer and mutually insulated; one of the first touch sensing electrode and the second touch sensing electrode is configured to be loaded with touch control scanning signals, and the other of the first touch sensing electrode and the second touch sensing electrode is configured to couple the touch control scanning signals and output. The touch sensing structure layer is provided on the opposite substrate that is away from (Continued)

the array substrate, which can avoid the mutual interference between touch control signals and display signals in the array substrate.

13 Claims, 3 Drawing Sheets

(56) References Cited

U.S. PATENT DOCUMENTS

| | | |
|---|---|---|
| 2011/0210944 A1 | 9/2011 | Chen et al. |
| 2014/0111473 A1 | 4/2014 | Yang et al. |

FOREIGN PATENT DOCUMENTS

| | | | | |
|---|---|---|---|---|
| CN | 102541334 | A | 7/2012 | |
| CN | 102799329 | A | 11/2012 | |
| CN | 102841718 | A | 12/2012 | |
| CN | 102937852 | A | 2/2013 | |
| CN | 103034377 | A * | 4/2013 | ............ G06F 3/044 |
| CN | 103034377 | A | 4/2013 | |
| CN | 103336635 | A | 10/2013 | |
| CN | 203241974 | U | 10/2013 | |

OTHER PUBLICATIONS

Written Opinion of the International Searching Authority Appln. No. PCT/CN2013/087015; Dated Feb. 27, 2014.

First Chinese Office Action Appln. No. 201310175442.5; Dated Aug. 27, 2015.

International Search Report mailed Feb. 27, 2014; PCT/CN2013/087015.

Second Chinese Office Action Appln. No. 201310175442.5; Dated Nov. 2, 2015.

* cited by examiner

CAPACITIVE IN-CELL TOUCH PANEL AND DISPLAY DEVICE

TECHNICAL FIELD

Embodiments of the present invention relates to a capacitive in-cell touch panel and a display device.

BACKGROUND

With the rapid development of display technology, touch screen panels have been gradually spreading throughout people's life. Nowadays, touch screen panels, according to configurations, can be classified into: add-on mode touch panels, on-cell touch panels, and in-cell touch panels. An add-on mode touch panel is a liquid crystal display having a touch function and is formed by producing a touch screen panel and a liquid crystal display (LCD) separately and then attaching them together. An add-on mode touch panel has disadvantages such as higher manufacturing costs, lower light transmittance, thicker module, and so on. An in-cell touch panel has touch control electrodes for a touch screen panel embedded inside a liquid crystal display, can decrease the whole thickness of the module, can have significantly reduced manufacturing costs for the touch screen panel, and thus become attractive to main manufacturers.

At present, a capacitive in-cell touch panel is realized by directly adding touch control scanning lines and touch control sensing lines on a current TFT (thin film transistor) array substrate, that is, on a surface of the TFT array substrate, manufacturing two layers of stripe-like electrodes that are non-coplanar but intersect with each other. These two layers of electrodes respectively serve as touch control driving lines and touch control sensing lines of the touch screen panel, and at a non-coplanar intersection between two of the electrodes, there forms a mutual capacitor. The working process of the capacitive in-cell touch panel is that: when the electrodes serving as touch control driving lines are loaded with touch control driving signals, the voltage signals coupled out by the touch control sensing lines via the mutual capacitor are detected, and during this process, when a human body contacts the touch screen panel, the electric field of the human body will act on the mutual capacitor, making the capacitance value of the mutual capacitor change and then changing the voltage signals coupled out by the touch control sensing lines, and the contact positions can be determined according to changes of the voltage signals.

In the configuration design of the abovementioned capacitive in-cell touch panel, the touch control signals, loaded over the touch control scanning lines and the touch control sensing lines that are added on the current TFT array substrate, will mutually interfere with the original display signals in the TFT array substrate, which not only has an influence on the quality of liquid crystal display pictures but also deteriorates the reliability of touch control operations.

SUMMARY

Embodiments of the present invention provide a capacitive in-cell touch panel and a display device, to solve the problem that there is mutual interference between display signals and touch control signals in a current in-cell touch panel.

A capacitive in-cell touch panel is provided by an embodiment of the present invention, comprising: an opposite substrate, an array substrate, and a liquid crystal layer located between the opposite substrate and the array substrate; a transparent touch sensing structure layer is provided on a side of the opposite substrate, which side faces the liquid crystal layer, and the touch sensing structure layer comprises: a first touch sensing electrode and a second touch sensing electrode that are disposed in a same layer and mutually insulated; one of the first touch sensing electrode and the second touch sensing electrode is configured to be loaded with touch control scanning signals, and the other of the first touch sensing electrode and the second touch sensing electrode is configured to couple the touch control scanning signals and output.

A display device provided by an embodiment of the present invention comprises the capacitive in-cell touch panel provided by the embodiment of the present invention.

BRIEF DESCRIPTION OF THE DRAWINGS

In order to clearly illustrate the technical solution of the embodiments of the invention, the drawings of the embodiments will be briefly described in the following; it is obvious that the described drawings are only related to some embodiments of the invention and thus are not limitative of the invention.

DETAILED DESCRIPTION

In order to make objects, technical details and advantages of the embodiments of the invention apparent, the technical solutions of the embodiments will be described in a clearly and fully understandable way in connection with the drawings related to the embodiments of the invention. Apparently, the described embodiments are just a part but not all of the embodiments of the invention. Based on the described embodiments herein, those skilled in the art can obtain other embodiment(s), without any inventive work, which should be within the scope of the invention.

Unless otherwise defined, all the technical and scientific terms used herein have the same meanings as commonly understood by one of ordinary skill in the art to which the present invention belongs. The terms "first," "second," etc., which are used in the description and the claims of the present application for invention, are not intended to indicate any sequence, amount or importance, but distinguish various components. Also, the terms such as "a," "an," etc., are not intended to limit the amount, but indicate the existence of at least one. The terms "comprise," "comprising," "include," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may include an electrical connection, directly or indirectly. "On," "under," "right," "left" and the like are only used to indicate relative position relationship, and when the position of the object which is described is changed, the relative position relationship may be changed accordingly.

The thicknesses and shapes of all the thin films in the accompanying drawings do not reflect the real scale, the objective of which is merely to schematically describe the embodiments of the present invention.

Figure 1:
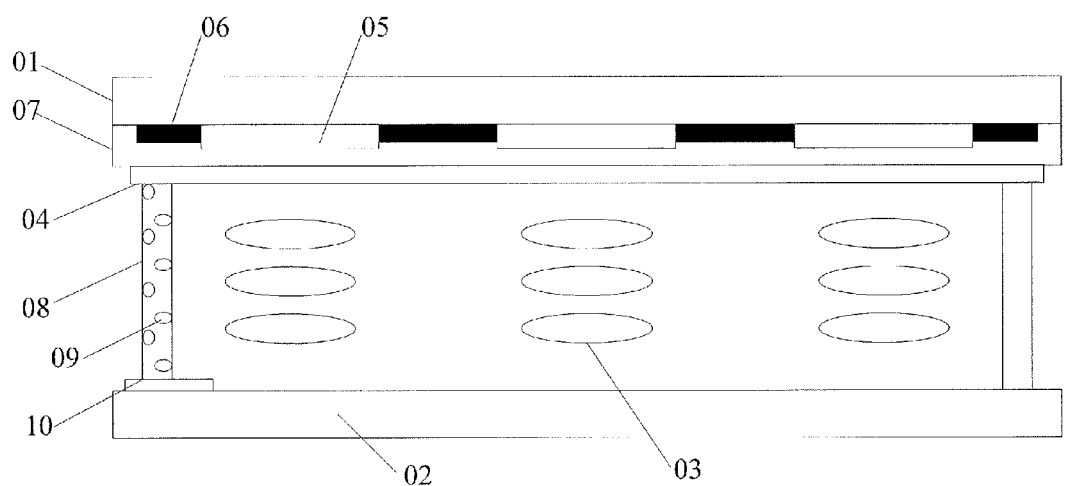
FIG. 1 is a schematic view showing the structure of a capacitive in-cell touch panel provided by an embodiment of the present invention.

An embodiment of the present invention provides a capacitive in-cell touch panel, as illustrated in FIG. 1, comprising: an opposite substrate 01, an array substrate 02, and a liquid crystal layer 03 located between the opposite substrate 01 and the array substrate 02.

Figure 2:
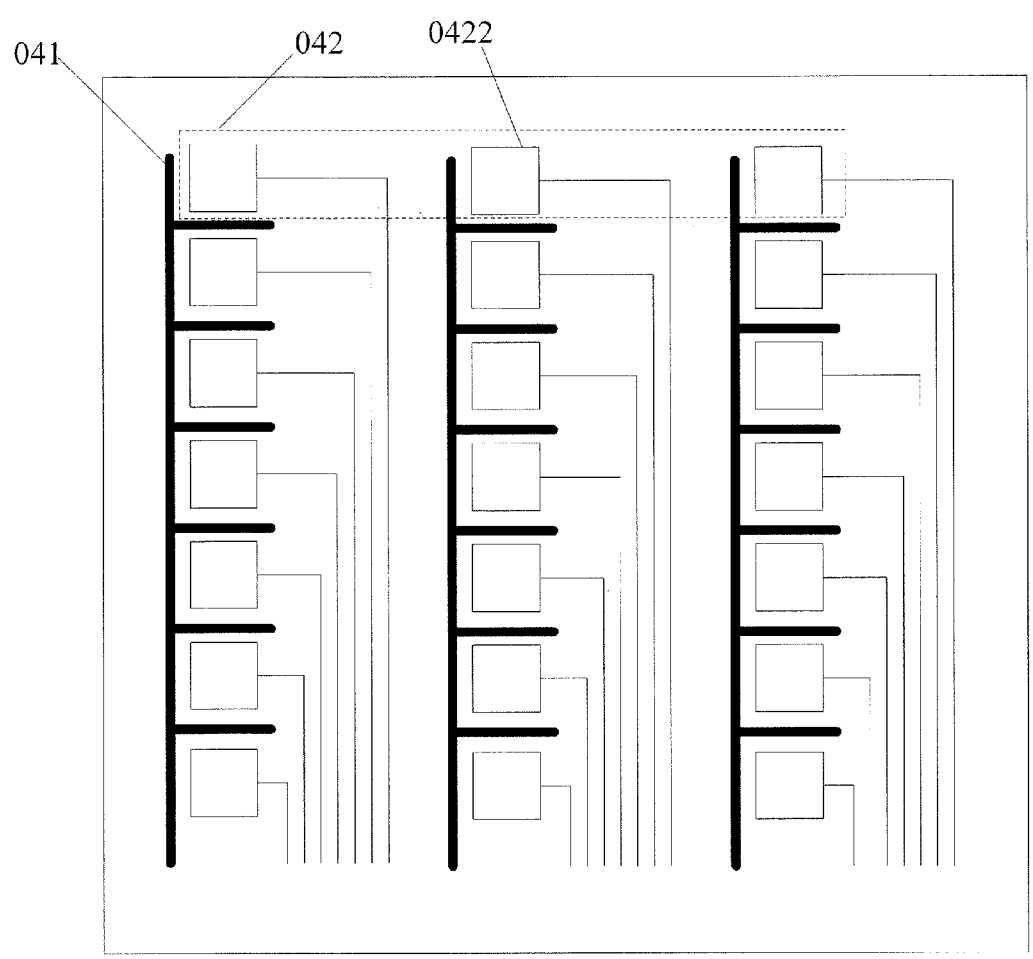
FIG. 2 is a schematic view showing the structure of the touch sensing structure layer in a capacitive in-cell touch panel provided by the embodiment of the present invention.

There is provided a transparent touch sensing structure layer 04 on a side of the opposite substrate 01 facing the liquid crystal layer 03. The touch sensing structure layer 04, as illustrated in FIG. 2, comprises: a first touch sensing electrode 041 and a second touch sensing electrode 042, which are disposed in a same layer and mutually insulated. The first touch sensing electrode 041 is configured to be loaded with touch control scanning signals, and the second touch sensing electrode 042 is configured to couple the touch control scanning signals and output; or the second touch sensing electrode 042 is configured to be loaded with touch control scanning signals, and the first touch sensing electrode 041 is configured to couple the touch control scanning signals and output.

The first touch sensing electrode 041 can be a touch sensing electrode (Rx, receive), and the second touch sensing electrode 042 can be correspondingly a touch driving electrode (Tx, transport); conversely, the first touch sensing electrode 041 can also be a touch driving electrode Tx, and the second touch sensing electrode 042 can be correspondingly a touch sensing electrode Rx. No limitations are imposed thereto. Both the first touch sensing electrode 041 and the second touch sensing electrode 042 may be made of a transparent conducting material such as indium tin oxides (ITO), and detailed description thereto is omitted here.

The touch screen panel provided by the embodiment of the present invention disposes the touch sensing structure layer 04 that realizes touch control on the opposite substrate 01 that is away from the array substrate 02, and thus can avoid the mutual interference between the touch control signals and the display signals in the array substrate 02, which not only ensures the quality of liquid crystal display pictures, but also increases the reliability of touch control operations. Further, in the touch sensing structure layer 04 disposed on the opposite substrate 01, the first touch sensing electrode 041 and the second touch sensing electrode 042 are disposed in a same layer, which can bring a comparatively simple structure, shorten manufacturing processes, and decrease production cost as compared with the process of respectively manufacturing two layers of stripe-like electrodes that are non-coplanar and intersect each to serve as the touch sensing structure layer.

Specifically, for example, the above-mentioned touch screen panel provided by an embodiment of the present invention, as illustrated in FIG. 1, can be used in a structure in which color filters 05 are disposed on the opposite substrate 01 that is opposite to the array substrate 02 (e.g., the opposite substrate 01 is a color filter substrate), and all the color filters 05 are mutually separated by a black matrix 06. Of course, the above-mentioned touch screen panel can also be applied to a structure in which color filters are disposed in the array substrate. No limitations are imposed thereto. The followings are descriptions of the above-mentioned touch screen panel provided by the embodiment of the present invention, taking a structure in which the opposite substrate 01 serves as a color filter substrate as an example.

In the touch screen panel provided by the embodiment of the present invention, the touch sensing structure layer 04 can be provided between the base substrate and the black matrix 06 of the opposite substrate 01, or as illustrated in FIG. 1, provided on the side of the black matrix 06 of the opposite substrate 01, which side faces the liquid crystal layer 03. No limitations are imposed thereto.

Furthermore, on the opposite substrate 01, there may be further provided a planarizing layer 07 between the black matrix 06 and the touch sensing structure layer 04. As illustrated in FIG. 1, when the touch sensing structure layer 04 is disposed on the side of the black matrix 06 facing the liquid crystal layer 03, the planarizing layer 07 provided between the black matrix 06 and the touch sensing structure layer 04 can flush the difference of thickness between the black matrix 06 and all the color filters 05, making the touch sensing structure layer 04 manufactured on the planarizing layer 07 relatively smooth. When the touch sensing structure layer 04 is disposed between the base substrate and the black matrix, the planarizing layer 07 disposed between the black matrix 06 and the touch sensing structure layer 04 can flush the difference of thickness at all positions on the touch sensing structure layer 04 after patterning, making the black matrix 06 and the color filters 05 manufactured on the planarizing layer 07 relatively in the same horizontal plane.

Specifically, for example, in the abovementioned touch screen panel provided by the embodiment of the present invention, the black matrix 06 formed on the opposite substrate 01 generally has opening regions that are arranged in a matrix, and there is disposed a color filter 05 in each opening region. The opening regions are opposite to the effective display region of each pixel unit. The first touch sensing electrodes 041 formed on the opposite substrate 01 can extend in the column direction of the opening regions, and the second touch sensing electrodes 042 can extend in the row direction of the opening regions, that is, the first touch sensing electrodes 041 disposed on the opposite substrate 01 and the data signal lines on the array substrate 02 have a same direction of wirings, and the second touch sensing electrodes 042 on the opposite substrate 01 and the gate signal lines in the array substrate 02 have a same direction of wirings. Or, the first touch sensing electrodes 041 formed on the opposite substrate 01 can extend in the row direction of the opening regions, and the second touch sensing electrodes 042 can extend in the column direction of the opening regions, that is, the first touch sensing electrodes 041 disposed on the opposite substrate 01 and the gate signal lines on the array substrate 02 have a same direction of wirings, and the second touch sensing electrodes 042 disposed on the opposite substrate 01 and the data signal lines on the array substrate 02 have a same direction of wirings. Of course, the extending directions of the first touch sensing electrodes 041 and the second touch sensing electrodes 042 disposed on the opposite substrate 01 can be also in other directions, with regard to which, there is no limitation.

The followings are descriptions with reference to the example in which the first touch sensing electrodes 041 extends in the column direction of the opening regions, and the second touch sensing electrodes 042 extends in the row direction of the opening regions.

Specifically, for example, in the touch screen panel provided by the embodiment of the present invention, in order to ensure that the touch sensing structure layer is of a single layer, that is to say, the first touch sensing electrodes 041 and the second touch sensing electrodes 042 need to be in a same layer and be mutually insulated without an additional metal layer such as a bridging metal layer, as illustrated in FIG. 2, and upon the touch sensing structure layer 04 being in design, the first touch sensing electrodes 041 and the second touch sensing electrodes 042 can be designed as a structure of interdigital electrodes, for example, each of the first touch sensing electrodes 041 is designed to be of a branched shape in the vertical direction, and the second touch sensing electrode 042 is divided into sub-electrodes 0422 of a block shape in the horizontal direction, and each block sub-electrode 0422 is led to an edge of the opposite substrate through a conductive line so as to be connected to a touch control driving IC chip on a flexible circuit panel (FPC) on the array substrate in the subsequent process. Certainly, the way of wirings of all the first touch sensing electrodes 041 and the second touch sensing electrodes 042 on the touch sensing structure layer 04 can be employed with other patterns; detailed description is omitted here.

Specifically, for example, the abovementioned touch screen panel provided by an embodiment of the present invention can be applied to all kinds of liquid crystal display panels of different modes, for example, it is suitable for in-plane switch (IPS) and advanced super dimension switch (ADS) type liquid crystal display panels that can achieve a wide visual angle, and also suitable for traditional twisted nematic (TN) type liquid crystal display panel; there are no limitations.

When a TN type liquid crystal display panel is employed to manufacture the abovementioned touch screen panel provided by an embodiment of the present invention, the common electrode layer on the color film substrate can be omitted, and in a time-sharing driving mode, the touch sensing electrodes that are made of a transparent conducting material can be multiplexed to realize the function of the common electrode layer.

Firstly, the time-period for the touch screen panel to display each frame is divided into a display time period (Display) and a touch control time period (Touch). For example, the time-period for the touch screen panel to display each frame is 16.7 ms, 5 ms of which are elected to serve as the touch control time period, and the rest 11.7 ms of which are used as the display time period. Certainly, the two kinds of time-periods can be properly adjusted according to the processing ability of an IC chip, and there are no specific limitations.

During a display time period, the first touch sensing electrodes and the second touch sensing electrodes both are loaded with common electrode signals, and at this time, the touch sensing structure layer is used as the common electrode, cooperating with the pixel electrodes on the array substrate to form an electric field to control the rotation of the liquid crystal.

During a touch control time period, the first touch sensing electrodes are loaded with touch control scanning signals, and the second touch sensing electrodes couple the touch control scanning signals and output; or the second touch sensing electrodes are loaded with touch control scanning signals, and the first touch sensing electrodes couple the touch control scanning signals and output.

Furthermore, when an IPS or ADS type liquid crystal display panel is used to manufacture the abovementioned touch screen panel provided by an embodiment of the present invention, and in a time-sharing driving mode can also be adopted, which is helpful to reduce the mutual interference between touch control signals and display signals.

Furthermore, in the touch screen panel provided by an embodiment of the present invention, a touch control driving IC chip controlling each of the first touch sensing electrodes and the second touch sensing electrodes in the touch sensing structure layer, and a display driving IC chip controlling the display of the liquid crystal can be disposed separately, which can reduce difficulties in manufacturing driving IC chips, and reduce the interference between touch control and display.

Figure 3:
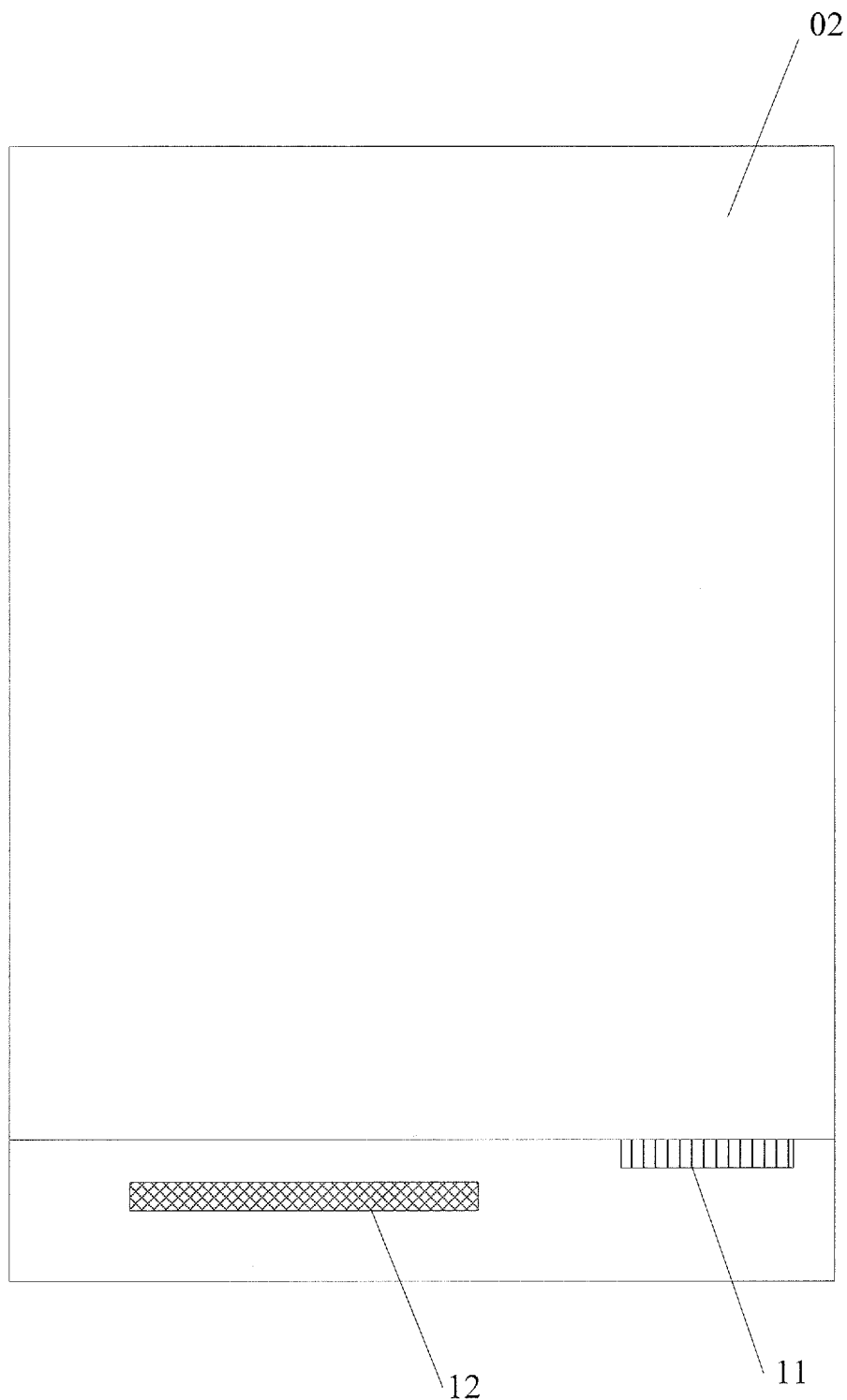
FIG. 3 is a top view schematically showing the array substrate in a capacitive in-cell touch panel provided by the embodiment of the present invention.

As illustrated in FIG. 1, conductive beads 09 may be disposed in a sealant 08 that hermetically connect the edges of the opposite substrate 01 and the array substrate 02; further, there are provided connection terminals 10 for the touch control driving chips in the non-effective regions of the array substrate 02. In this way, the first touch sensing electrodes 041 and the second touch sensing electrodes 042 in the touch sensing structure layer 04 can be connected to the connection terminals 10 for the touch control driving chips via the conductive beads 09, and can bond the flexible circuit panel (FPC) for the touch control driving IC chips at the connection terminals 10 for the touch control driving chip to realize touch control driving. As illustrate in FIG. 3, a touch control driving IC chip 11 realizing touch control and a display driving IC chip 12 realizing display are disposed separately on the array substrate 02.

In manufacturing the array substrate, the connection terminals of touch control chips and pixel electrodes or common electrodes (ADS type) on the array substrate can be disposed in a same layer to reduce patterning processes.

In accordance with a same inventive concept, an embodiment of the present invention further provides a display device, comprising the abovementioned capacitive in-cell touch panel provided by an embodiment of the present invention, and the implementation of the display device can refer to the embodiment of the abovementioned capacitive in-cell touch panel. Repeated descriptions are omitted here.

In a capacitive in-cell touch panel and a display device provided by embodiments of the present invention, a transparent touch sensing structure layer is provided on a side of an opposite substrate that is opposite to an array substrate, which side faces a liquid crystal layer, and the touch sensing structure layer comprises: a first touch sensing electrode and a second touch sensing electrode that are disposed in a same layer and mutually insulated. Because the touch sensing structure layer that realizes touch control is disposed on the opposite substrate that is away from the array substrate, the mutual interference between touch control signals and display signals in the array substrate can be avoided, which not only ensures the quality of liquid crystal display pictures, but also increases the reliability of touch control operations. Besides, in the touch sensing structure layer disposed on the opposite substrate, the first touch sensing electrode and the second touch sensing electrode are disposed in a same layer, which can bring a comparatively simple structure, shorten manufacturing processes, and decrease production costs as compared with the case of respectively manufacturing two layers non-coplanar intersecting stripe-like electrodes to serve as the touch sensing structure layer.

It is apparent to those skilled in the art to make various modifications and variations to the present invention without departing from the spirit and scope of the present invention. In this way, if these modifications and variations belong to the scope of the claims of the present invention and their equivalents, then the present invention is intended to cover these modifications and variations.

The invention claimed is:

1. A capacitive in-cell touch panel, comprising:
   an opposite substrate, an array substrate, and a liquid crystal layer located between the opposite substrate and the array substrate, wherein a transparent touch sensing structure layer is provided on a side of the opposite substrate, which side faces the liquid crystal layer, and the touch sensing structure layer comprises:

a first touch sensing electrode and a second touch sensing electrode that are disposed in a same layer and mutually insulated;

one of the first touch sensing electrode and the second touch sensing electrode is configured to be loaded with touch control scanning signals, and the other of the first touch sensing electrode and the second touch sensing electrode is configured to couple the touch control scanning signals and output;

wherein the capacitive in-cell touch panel further comprising a sealant that hermetically connects edges of the opposite substrate and the array substrate, conductive beads being provided within the sealant; and connection terminals of a touch control driving chip, provided in a non-effective display region of the array substrate;

wherein the first touch sensing electrode and the second touch sensing electrode in the touch sensing structure layer are connected to the connection terminals of the touch control driving chip via the conductive beads.

2. The touch panel as claimed in claim 1, wherein the touch sensing structure layer is provided between a base substrate of the opposite substrate and a black matrix, or provided on a side of the black matrix of the opposite substrate, which side faces the liquid crystal layer.

3. The touch panel as claimed in claim 2, wherein a planarizing layer is provided between the black matrix and the touch sensing structure layer.

4. The touch panel as claimed in claim 1, wherein the black matrix of the opposite substrate comprises opening regions that are arranged in a matrix;

the first touch sensing electrode extends in a row direction of the opening regions, and the second touch sensing electrode extends in a column direction of the opening regions, or the second touch sensing electrode extends in the row direction of the opening regions, and the first touch sensing electrode extends in the column direction of the opening regions.

5. The touch panel as claimed in claim 1, wherein the first touch sensing electrode and the second touch sensing electrode form a structure of interdigital electrodes.

6. The touch panel as claimed in claim 1, wherein the connection terminals of touch control chips are disposed in a same layer as pixel electrodes or common electrodes on the array substrate.

7. The touch panel as claimed in claim 1, wherein the touch sensing electrodes form a common electrode layer;

during a display time period, the first touch sensing electrode and the second touch sensing electrode are loaded with a common electrode signal respectively;

during a touch control time period, one of the first touch sensing electrode and the second touch sensing electrode is loaded with a touch control scanning signal, and the other of the first touch sensing electrode and the second touch sensing electrode couples the touch control scanning signals and outputs.

8. The touch panel as claimed in claim 1, wherein a touch control driving IC chip and a display driving IC chip are provided on the array substrate.

9. A display device, comprising the capacitive in-cell touch panel as claimed in claim 1.

10. The touch panel as claimed in claim 2, wherein the touch sensing electrodes form a common electrode layer;

during a display time period, the first touch sensing electrode and the second touch sensing electrode are loaded with a common electrode signal respectively;

during a touch control time period, one of the first touch sensing electrode and the second touch sensing electrode is loaded with a touch control scanning signal, and the other of the first touch sensing electrode and the second touch sensing electrode couples the touch control scanning signals and outputs.

11. The touch panel as claimed in claim 4, wherein the touch sensing electrodes form a common electrode layer;

during a display time period, the first touch sensing electrode and the second touch sensing electrode are loaded with a common electrode signal respectively;

during a touch control time period, one of the first touch sensing electrode and the second touch sensing electrode is loaded with a touch control scanning signal, and the other of the first touch sensing electrode and the second touch sensing electrode couples the touch control scanning signals and outputs.

12. The touch panel as claimed in claim 5, wherein the touch sensing electrodes form a common electrode layer;

during a display time period, the first touch sensing electrode and the second touch sensing electrode are loaded with a common electrode signal respectively;

during a touch control time period, one of the first touch sensing electrode and the second touch sensing electrode is loaded with a touch control scanning signal, and the other of the first touch sensing electrode and the second touch sensing electrode couples the touch control scanning signals and outputs.

13. The touch panel as claimed in claim 2, wherein the first touch sensing electrode and the second touch sensing electrode form a structure of interdigital electrodes.

* * * * *